No. 856,661. PATENTED JUNE 11, 1907.
A. SHUMAN.
MACHINE FOR MAKING WIRE GLASS.
APPLICATION FILED AUG. 15, 1905.
2 SHEETS—SHEET 2.
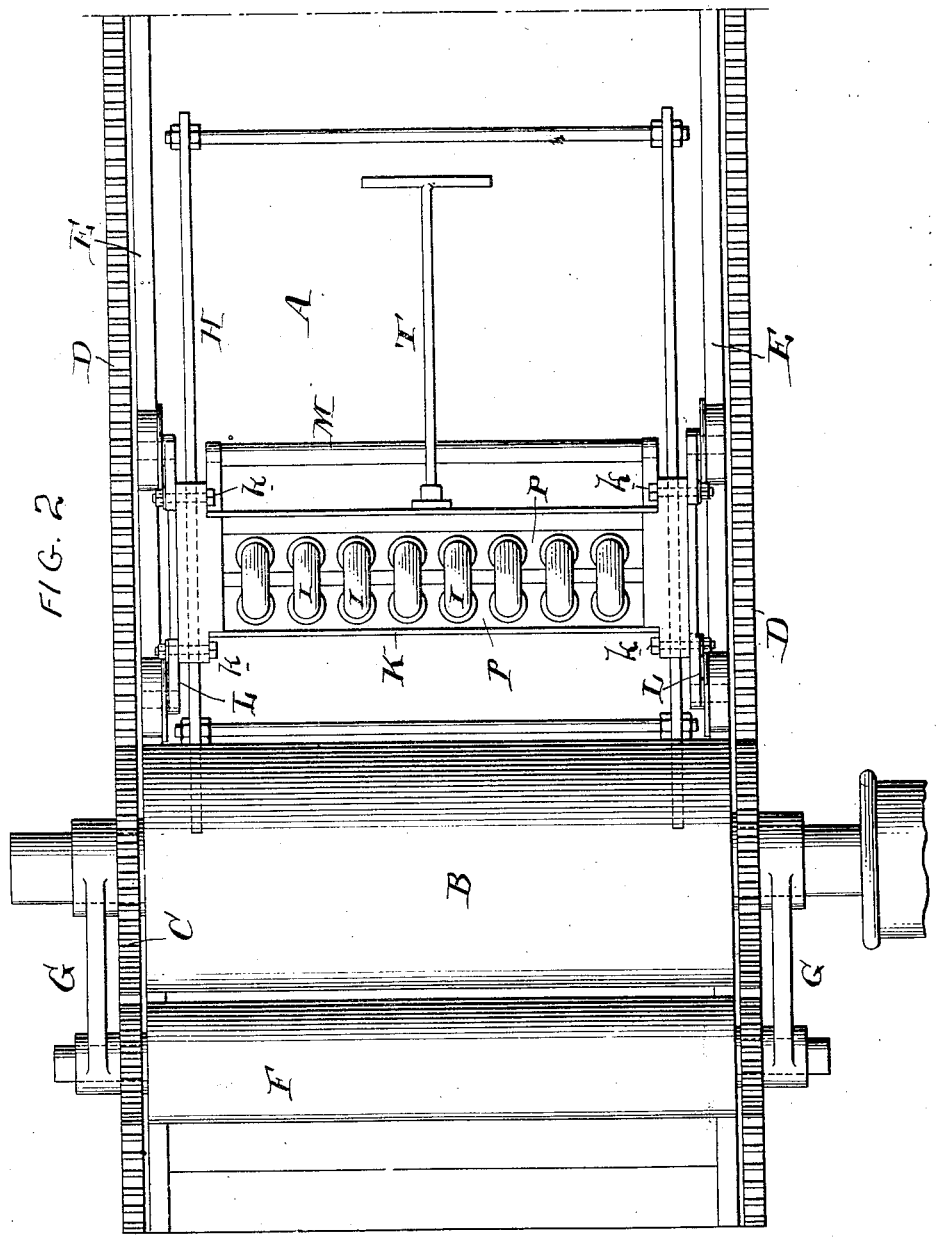

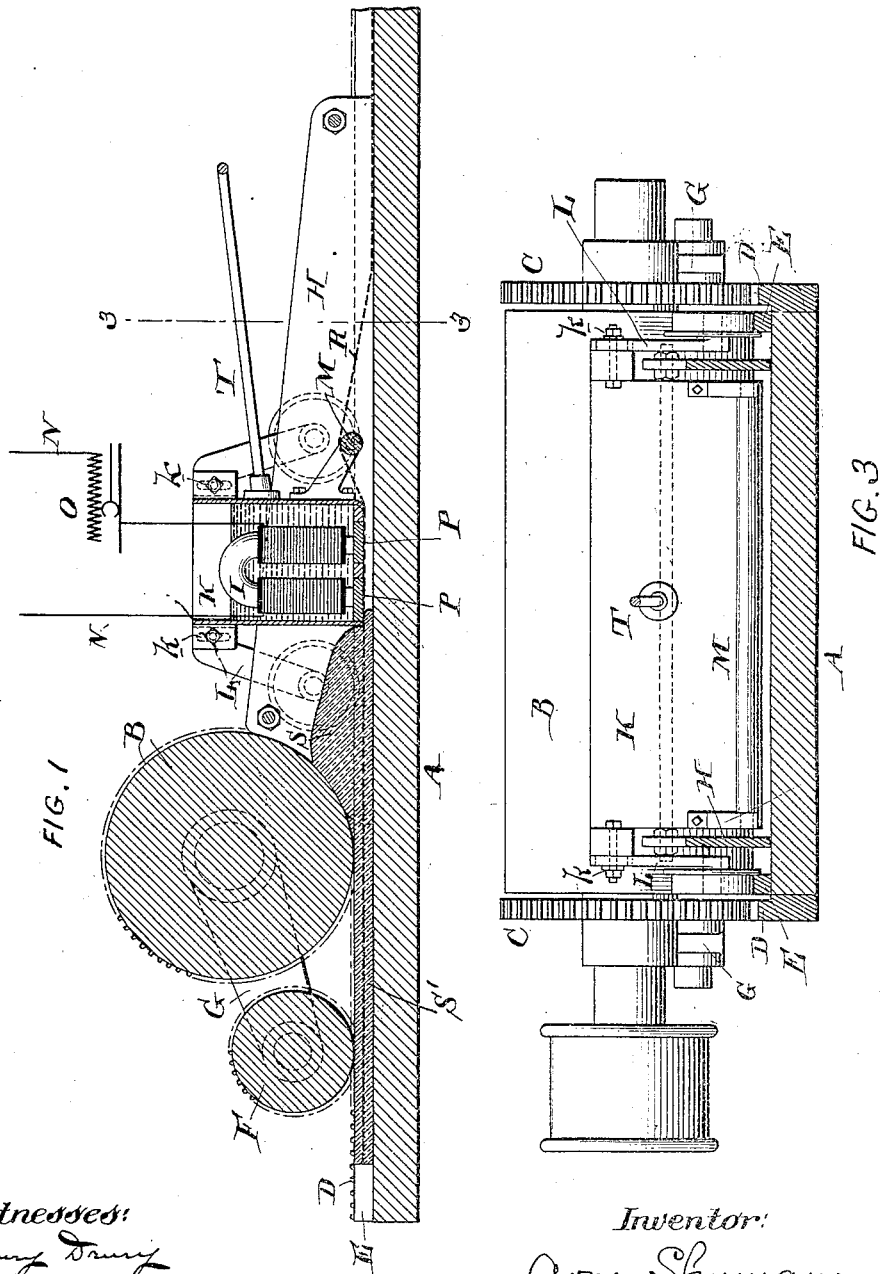

UNITED STATES PATENT OFFICE.

ARNO SHUMAN, OF CONNELLSVILLE, PENNSYLVANIA, ASSIGNOR TO THE CONTINUOUS GLASS PRESS COMPANY, A CORPORATION OF PENNSYLVANIA.

MACHINE FOR MAKING WIRE-GLASS.

No. 856,661.     Specification of Letters Patent.     Patented June 11, 1907.

Application filed August 15, 1905. Serial No. 274,252.

*To all whom it may concern:*

Be it known that I, ARNO SHUMAN, of Connellsville, county of Fayette, and State of Pennsylvania, have invented an Improvement in Machines for Making Wire-Glass, of which the following is a specification.

My invention has reference to machines for making wire glass and consists of certain improvements which are fully set forth in the following specification and shown in the accompanying drawings which form a part thereof.

The object of my invention is to provide a construction of machine which will roll a sheet of glass and at the same time introduce a wire mesh into the body of the glass, the position of the wire mesh as it is fed into the glass being governed and controlled by magnetic devices.

My invention consists of a roller and table of ordinary construction for rolling a sheet of glass, combined with magnetic or electro magnetic devices supported above the table in advance of the roller for holding the wire mesh suspended at the proper distance above the table to cause it to enter the advancing glass at the right level so as to be within the body of the glass sheet and completely inclosed by the upper and lower portions of the glass forming the upper and lower surfaces thereof.

My invention also comprehends details of construction which, together with the features above specified will be better understood by reference to the drawings, in which:

Figure 1 is a sectional side elevation of a wire glass making machine embodying my invention; Fig. 2 is a plan view of a portion of the same; and Fig. 3 is a cross section of the same.

A is the bed or table upon which the glass sheet is rolled by the rollers B and F. The roller B runs upon guide strips E which support it at the proper elevation above the table to insure the proper thickness of glass being formed. The ends of this roller are provided with gears C which mesh with racks D on each side of the table so as to insure both ends of the roller traveling at the same speed.

H is the plow or canon and is pushed along the table in front of and by the roller B as it advances, its object being to confine the glass ball S laterally so that it shall not flow beyond the rolling surface of the roller B. The roller F is essentially a finishing roller for smoothing or figuring the surface of the glass and is connected to the axis of the roller B by links G. It may also be geared to the racks D if so desired. This roller F is not at all essential and may be dispensed with if necessary.

The apparatus so far as described is of the usual construction for rolling sheet glass.

In making wire glass it is necessary to feed into the glass S before being rolled into the sheet form a wire mesh and so locate it in the body of the glass that it shall be completely inclosed by the glass and preferably arranged centrally between the two faces of the glass sheet. I will now describe the improved means which I employ for this purpose.

L are carriages which are guided upon guide strips or rails E or in any other way along the table. Carried by these carriages is a tank or frame K supported above the table, A, a distance approximately equal to one-half the thickness of the glass sheet S' to be rolled. This tank contains a series of electro magnets I having common pole pieces P P extending parallel and transversely across the table A. I prefer that these pole pieces P P shall form part of or extend through the bottom of the tank K as shown. The pole pieces should be of iron or steel and the tank would best be made of copper, brass or other non-magnetic material.

In ordinary operation the tank is kept filled with water or other cooling fluid which may by any suitable means be changed from time to time automatically or otherwise. While it is more convenient to use water as the cooling medium or fluid, any other cooling fluid or medium may be used in lieu thereof. A handle T connected to the tank may be employed for moving it along the table.

N is an electric circuit leading from any source of electric energy and supplying electricity to the electro-magnets I. The current strength may be regulated by a controller O of any suitable construction.

M is a roller or transverse guide in front of the tank and carried by it and over which the wire mesh R may be fed, said wire passing over said roller and under the pole pieces P of the electro-magnets and thence into the glass S. As the meshed wire is of iron and consequently magnetic material, it will be supported by the pole pieces P of the magnets and thereby fed into the advancing glass S at exactly the proper distance above the surface of the table A.

In the operation of the apparatus, the tank K is moved forward at a slightly less speed than the roller B so as to keep the lower rear edge of the tank in contact with the glass S. The glass will not pass under the tank or pole pieces to any material extent but will flow upon and through the meshes of the wire mesh R and deliver the right amount of glass under it at a time when the said wire is positively held in position under the magnetic attraction of the magnets. The glass cannot overheat the guiding means for the wire because there is an air space below it and it is also water cooled. If desired, the transverse guide roller M may be dispensed with, but I deem it best to have some guide to keep the meshed wire off the table when approaching the magnets so as not to allow it to become too hot. The tank may be adjusted vertically by the employment of the screw and slots k for attaching it to the carriages, and thereby have capacity for feeding the wire mesh into the glass at different elevations above the table.

My invention, broadly considered, comprehends magnetic or electro magnetic devices for supporting the wire mesh above the table while it is being fed into the glass and I therefore do not confine myself to the details of construction of the apparatus herein shown and described, it having been given as an excellent adaptation of my invention for commercial manufacture of wire glass.

Having now described my invention, what I claim as new and desire to secure by Letters Patent, is:

1. In a machine for making wire glass, the combination of a table upon which the glass is rolled, a roller for rolling the glass upon the table, and a magnetic device arranged in advance of the roller for magnetically guiding the wire mesh above the table and immediately into the mass of molten glass being acted upon by the roller.

2. In a machine for making wire glass, the combination of a table upon which the glass is rolled, a roller for rolling the glass upon the table, and an electro-magnetic device arranged in advance of the roller for magnetically supporting the wire mesh above the table immediately in advance of the roller simultaneously with the rolling of the glass by said roller.

3. In a machine for making wire glass, the combination of a stationary table upon which the glass is rolled, a traveling roller for rolling the glass upon the table, a traveling magnetic device arranged in advance of the roller and adjacent to the mass of molten glass being rolled for magnetically supporting the wire mesh above the table during the rolling of the glass thereon, consisting of a traveling frame having transverse magnetic pole pieces slightly above the surface of the table, and means for keeping said pole pieces cool.

4. In a machine for making wire glass, the combination of a table upon which the glass is rolled, a roller for rolling the glass upon the table, and an electro-magnetic device arranged in advance of the roller for magnetically supporting and guiding the wire mesh above the table while the glass is being rolled over it, consisting of a tank having pole pieces in its bottom, electro-magnets within the tank and connected with the pole pieces, and means for cooling the tank.

5. In a machine for making wire glass, the combination of a table upon which the glass is rolled, a roller for rolling the glass upon the table, and an electro-magnetic device arranged in advance of the roller for magnetically supporting and guiding the wire mesh above the table while the glass is being rolled over it, consisting of a carriage traveling along the table, electro-magnetic devices carried by the carriage, and means for adjusting said electro-magnetic devices on the carriage so as to bring them nearer to or farther from the table.

6. In a machine for rolling wire glass, the combination of a table, a roller traveling over the table, and movable magnetic devices arranged in front of the roller and slightly above the table for supporting the wire mesh above the table in advance of the roller and a guide for guiding the wire mesh above the table and under the magnetic devices.

7. In a machine for rolling wire glass, the combination of a table, a roller traveling over the table, movable magnetic devices arranged in front of the roller and slightly above the table for supporting and guiding the wire mesh above the table and into the molten glass in front of the advancing roller, and means for adjusting the magnetic devices to or from the table.

8. In a machine for rolling wire glass, the combination of a table, a roller traveling over the table, and movable magnetic devices arranged in front of the roller and slightly above the table for supporting the wire mesh above the table in advance of the roller, the said roller and magnetic devices being independently movable over the table whereby the roller may be moved at a greater speed than the magnetic devices.

9. In a machine for making wire glass, the combination of a single table upon which the glass sheet is rolled, a roller, and the electro magnetic guide, said guide being constructed to guide the meshed wire sheet into the mass of molten metal slightly above the level of the table simultaneously with the rolling of the said glass by the roller.

10. The method of making wire glass which consists in rolling a mass of molten glass into a sheet and simultaneously therewith feeding into the advancing end of the glass a wire meshed sheet whereby it is enveloped in the mass of the glass and intermediate of the two surfaces thereof during the rolling operation, and simultaneously therewith electro magnetically suspending the wire meshed sheet immediately at the place where it enters the mass of molten glass, whereby said meshed wire sheet is suspended and guided to the mass of molten glass at the desired distance below the lower surface thereof.

In testimony of which invention, I hereunto set my hand.

ARNO SHUMAN.

Witnesses:
W. H. WILLIAMS,
M. D. WILLIAMS.